(12) United States Patent
Teague

(10) Patent No.: US 9,170,092 B2
(45) Date of Patent: Oct. 27, 2015

(54) SYSTEM FOR DETECTING MISALIGNMENT OF AN AERO SURFACE

(75) Inventor: Phillip Vincent Teague, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 50 days.

(21) Appl. No.: 13/996,276

(22) PCT Filed: Dec. 19, 2011

(86) PCT No.: PCT/GB2011/052512
§ 371 (c)(1),
(2), (4) Date: Jun. 20, 2013

(87) PCT Pub. No.: WO2012/085546
PCT Pub. Date: Jun. 28, 2012

(65) Prior Publication Data
US 2013/0301049 A1 Nov. 14, 2013

(30) Foreign Application Priority Data
Dec. 21, 2010 (GB) .................................. 1021579.6

(51) Int. Cl.
*G01B 11/14* (2006.01)
*B64D 45/00* (2006.01)

(52) U.S. Cl.
CPC ............ *G01B 11/14* (2013.01); *B64D 45/0005* (2013.01); *B64D 2045/001* (2013.01)

(58) Field of Classification Search
CPC . G03F 9/7088; G03F 7/70358; G03F 9/7076; G03F 9/7084; G03F 9/00; G03F 9/7011; G03F 9/7065; G03F 7/70108; G03F 7/70225; G01B 11/272; G01B 11/26; G01B 11/27; G01B 11/00; G01B 11/14
USPC ......... 356/400, 401, 153, 614, 138, 622, 620, 356/152.2, 152.3, 445
See application file for complete search history.

(56) References Cited

U.S. PATENT DOCUMENTS 4,346,994 A * 8/1982 Cruz ......................... 356/139.03
4,967,071 A * 10/1990 Park et al. ................. 250/227.21
(Continued)

FOREIGN PATENT DOCUMENTS

| CN | 102322825 B | * | 1/2012 | ............. G01B 11/27 |
|---|---|---|---|---|
| EP | 0726201 A1 | | 8/1996 | |
| EP | 1637453 A2 | | 3/2006 | |
| GB | 2469910 A | | 11/2010 | |
| WO | 2007065622 A1 | | 6/2007 | |

OTHER PUBLICATIONS

Espacenet Machine Translation of foregin Document CN102322825 (B) to YongHua et al. (Jan. 2012).*
(Continued)

*Primary Examiner* — Tarfur Chowdhury
*Assistant Examiner* — Mohamed Amara
(74) *Attorney, Agent, or Firm* — Hauptman Ham, LLP

(57) ABSTRACT

A system for detecting misalignment of an aero surface relative to other aero surfaces during simultaneous deployment of the aero surfaces is disclosed. A generator configured to shine a laser through aligned apertures in a series of aero surfaces towards a reflector during deployment of the aero surfaces, a receptor to detect reflection of the laser from the reflector back through the apertures to the generator and, a controller operable to terminate further deployment of the aero surfaces in the event that no reflection is detected by the receptor, or if an actual time taken for the reflected beam of light to be detected by the receptor differs from a predetermined time.

10 Claims, 2 Drawing Sheets

(56) References Cited

U.S. PATENT DOCUMENTS

| | | | |
|---|---|---|---|
| 5,628,477 A * | 5/1997 | Caferro et al. | 244/214 |
| 6,118,538 A * | 9/2000 | Haugan et al. | 356/623 |
| 7,069,120 B1 * | 6/2006 | Koenck et al. | 701/3 |
| 8,967,551 B2 * | 3/2015 | Parker | 244/214 |
| 2002/0171556 A1 | 11/2002 | Emaci et al. | |
| 2007/0051183 A1 | 3/2007 | Schievelbusch | |
| 2009/0212977 A1 | 8/2009 | Pohl | |
| 2010/0201972 A1 * | 8/2010 | Marsh et al. | 356/152.1 |
| 2010/0277346 A1 * | 11/2010 | Moy et al. | 340/945 |
| 2011/0035056 A1 * | 2/2011 | Richards | 700/275 |

OTHER PUBLICATIONS

International Search Report and Written Opinion corresponding to PCT/GB2011/052512, dated Apr. 23, 2012.

Search Report corresponding to GB1021579.6, dated Apr. 20, 2011.

* cited by examiner

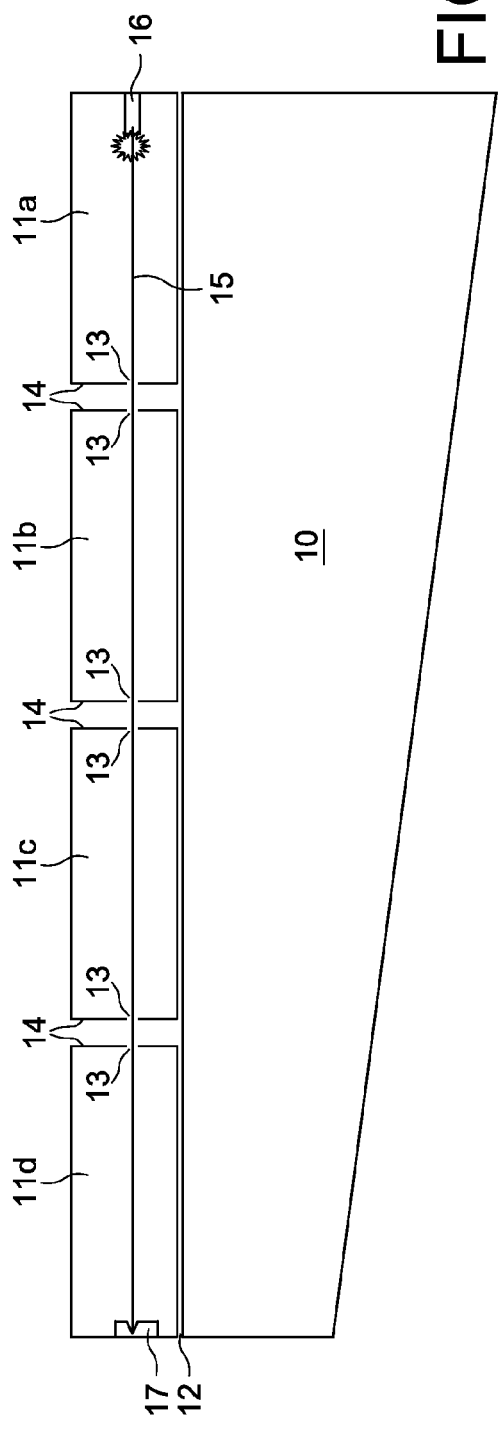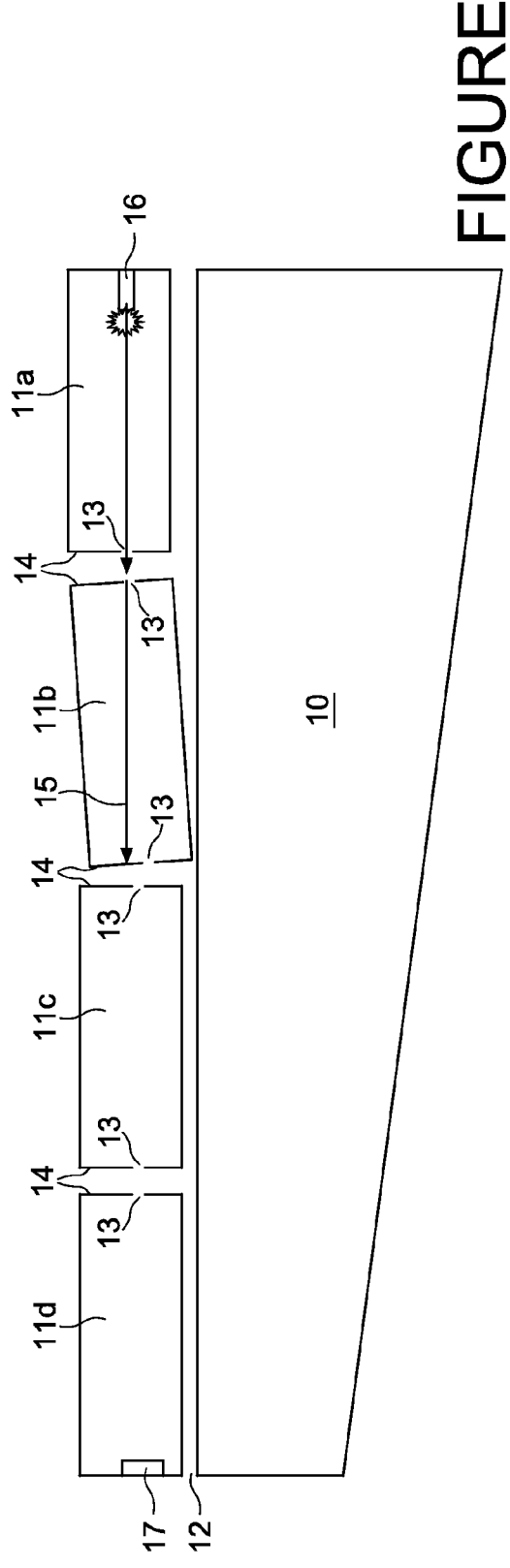

SYSTEM FOR DETECTING MISALIGNMENT OF AN AERO SURFACE

RELATED APPLICATIONS

The present application is a National Phase of International Application Number PCT/GB2011/052512, filed Dec. 19, 2011, and claims priority from British Application Number 1021579.6, filed Dec. 21, 2010.

INTRODUCTION

The present invention relates to a system for detecting misalignment of an aero surface of a number of aero surfaces on an aircraft that are mechanically synchronised under normal conditions such that they extend and retract together with parallel motion. Such moving surfaces may be the slats extending from the leading edge of a wing of an aircraft, although the system of the invention may also be used in conjunction with other moving surfaces. A method of detecting misalignment in aero surfaces is also disclosed.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

An assembly is required to support and guide movement of a slat between stowed and deployed positions and a typical arrangement showing a cross-section through part of a wing 1 and a slat 2 in its stowed position is illustrated in FIG. 1. As can be seen from FIG. 1, the slat 2 is provided with an arcuate support arm or slat track 3, one end 4 of which is attached to the rear of the slat 2 and extends into the wing 1. To allow for wing bending and manufacturing tolerances, the end 4 of the wing is attached to the slat using spherical bearings and linkages (not shown). The slat track 3 penetrates wing spar 6 forming the wing structure. The slat track 3 defines an arc having an axis and is mounted within the wing so that it can rotate about that axis (in the direction indicated by arrows "A" and "B" in FIG. 1) to deploy and retract the slat 2 attached to one end of the slat track 3.

To drive the slat track 3 so as to deploy or retract the slat 2, a toothed slat track rack 7 having an arcuate shape corresponding to the arcuate shape of the slat track 3 is mounted within a recess 3a on the slat track 3 and a correspondingly toothed drive pinion 8 is in engagement with the teeth 7a on the slat track rack 7 so that when the drive pinion 8 rotates, the teeth 8a on the drive pinion 8 and the teeth 7a on the rack 7 cooperate to pivot or drive the slat rack 7 and the slat attached thereto, into a deployed position, i.e. in the direction of arrow "A" in FIG. 1. Typically, the slat track 3 rotates through an angle of 27 degrees between its fully stowed and fully deployed positions. Rotation of the pinion 8 in the opposite direction also drives the slat track 3, in the direction of arrow "B", back into its stowed position, as shown in FIG. 1.

Although not shown in FIG. 1, each drive pinion 8 is geared to an outer shaft of a geared rotary actuator which extends concentrically over an inner input drive shaft that extends along the length of the wing within its leading edge, and which is driven by a slat deployment motor coupled to the inner input drive shaft at an inboard end of the wing. The inner input drive shaft is a common input drive shaft so that the slat deployment motor is operable to deploy all the slats of one wing together. The geared rotary actuator couples the inner input shaft to the outer output shaft so that the output shaft is driven by the inner input shaft. The rotary actuator also controls the speed of rotation of the output shaft relative to the input shaft so that the output shaft rotates approximately 200 to 300 times slower than the input shaft. A separate rotary actuator is associated with each drive pinion 8 and its accompanying slat track rack so there may be two or more geared rotary actuators per slat spaced along the length of the wing and extending concentrically over the input shaft.

The aforementioned assembly and method of deployment is described by way of example only and the detection system is applicable to the monitoring of the movement of any aero surfaces that are deployed together, irrespective of how that movement is achieved.

It is important to ensure that all the slats remain in alignment and deploy together and that, in the event of any misalignment such as skewing or asymmetry of one or more slats, continued operation of the actuation system is stopped and damage to the wing or the attachments between the wing and the moving surface is prevented. Skewing of a slat occurs when one of a number of slat deployment mechanisms associated with the same slat fails so that the slat deploys at an angle because it is still being driven away from the leading edge of the wing at an angle by the remaining slat deployment mechanism(s) associated with that slat. Asymmetry occurs when the slats on one wing are deployed at a different rate or extent to the slats on the other wing. Asymmetry or skewing of slats can be caused as a result of, for example, a defective rotary actuator, common drive shaft or coupling between the inner shaft and an outer shaft of a rotary actuator.

It is known to provide misalignment detection systems that rely on electo-mechanical technology and may include sensors and a lanyard passed through the aero bodies and connected to a switch at the end of the lanyard. However, such systems have to be able to accommodate misalignment caused by wing bending, thermal expansion and build tolerances and so must be inherently insensitive to ensure that false indications of misalignment are not given. This means that a significant misalignment may occur prior to it becoming detectable.

The present invention seeks to overcome or substantially alleviate the problems referred to above by providing a reliable and accurate system for detecting misalignment of a moving surface relative to other moving surfaces and for immediately stopping further deployment as soon as any misalignment is detected.

SUMMARY OF THE INVENTION

According to the present invention, there is provided a system for detecting misalignment of an aero surface relative to other aero surfaces during simultaneous deployment of said aero surfaces, comprising a generator configured to shine a beam of light, such as a laser, through aligned apertures in a series of aero surfaces towards a reflector during deployment of said aero surfaces, a receptor to detect reflection of said beam of light from said reflector back through said apertures to the generator and, a controller operable to terminate further deployment of said aero surfaces in the event that no reflection is detected by said receptor or, if an actual time taken for the reflected beam of light to be detected by the receptor differs from a predetermined time.

If a misalignment occurs, the holes in adjacent aero surfaces will fall out of alignment resulting in cutting of the light beam. As the light beam will no longer be reflected back to the receptor a signal may be generated indicating that a misalignment has occurred which can be fed to the actuator controlling deployment of the aero surfaces thereby causing them to stop deployment.

The system of the invention has the advantage of the being lightweight and being insensitive to thermal expansion and build tolerances. It also has very low power consumption, is easy to install with minimal adjustment and are largely maintenance free. The components of the system are also inexpensive to manufacture.

In one embodiment, the apertures are shaped so that the beam of light will shine through said apertures and reflect back off the reflector to the receptor throughout the whole range of deployment of the aero surfaces and in the absence of any misalignment of one or more aero surfaces.

Preferably, the receptor and the generator are integrally formed.

The generator and/or the reflector may be mounted to an aero surface for movement together with said surface.

In one embodiment, the system may comprise multiple generators and receptors spaced from each other to detect misalignment of an aero surface within individual groups of aero surfaces.

In one embodiment, rather than the absence of any reflection, the time taken for reflection to occur may be used in order to determine slat misalignment. In this embodiment, the predetermined time is preferably the time taken for a beam of light to pass through all the aero surfaces being monitored and to reflect back to the receptor, the controller being configured to measure the actual time and compare it with the predetermined time and to terminate further deployment of the aero surfaces if the actual time differs from the predetermined time at all, or differs from the predetermined time by more than a predetermined amount. In this embodiment, reflection of the beam will occur irrespective of slat misalignment and the aero surfaces are provided with reflective surfaces adjacent the holes so that reflection will occur off these surfaces in the event of misalignment. However, the controller is able to perform a comparison of the actual time taken between the beam being emitted and the beam being reflected and to compare the actual time with a predetermined time representing the time taken for the beam to be detected by the receptor when there is no slat misalignment. In the event that the actual and predetermined time do not match, or differ from each other by a certain degree, which will occur if the beam is reflected off an aero surface in a misaligned state because it will be reflected more quickly due to the shorter distance traveled by the beam, the controller may cease further deployment of the aero surfaces.

This embodiment may also be used to provide an indication as to which aero surface has become misaligned by pre-programming the controller with an individual time associated with each aero surface, each individual time relating to the time taken for a beam of light to reflect back off a misaligned aero surface.

The controller may then be configured so as to compare the actual time with each individual time and to provide an indication as to which aero surface is in a misaligned condition.

According to the invention, there is also provided a system for detecting misalignment of a slat relative to other slats during simultaneous deployment of said slats from the leading edge of an aircraft wing, comprising a generator configured to shine a beam of light through aligned apertures in a series of slats towards a reflector during deployment of said slats, a receptor to detect reflection of said beam of light from said reflector back through said apertures to the generator and, a controller operable to terminate further deployment of said slats from the leading edge of said aircraft wing in the event that no reflection is detected by said receptor, or if an actual time taken for the reflected beam of light to be detected by the receptor differs from a predetermined time.

The wing has leading and trailing edges lying in a first plane and, an axis that extends in substantially at right angles to said first plane, the apertures preferably having an elongate shape extending in the direction of said axis.

According to the invention, there is also provided a method of detecting misalignment of an aero surface relative to other aero surfaces during simultaneous deployment of said aero surfaces, comprising the steps of shining a beam of light through aligned apertures in a series of aero surfaces towards a reflector during deployment of said aero surfaces, detecting reflection of said beam of light and terminating further deployment of said aero surfaces in the event that no reflection is detected by said receptor or, determining if an actual time taken for the reflected beam of light to be detected by the receptor differs from a predetermined time.

Preferably, the predetermined time is the time taken for a beam of light to pass through all the aero surfaces and reflect back to the receptor and the method includes the step of measuring the actual time and comparing it with the predetermined time and terminating further deployment of the aero surfaces if the actual time differs from the predetermined time by more than a predetermined amount.

The controller may be pre-programmed with an individual time associated with each aero surface, each individual time relating to the time taken for a beam of light to reflect back off a misaligned aero surface. In this case, the method may include the step of comparing the actual time with each individual time to provide an indication as to which aero surface is in a misaligned condition.

BRIEF DESCRIPTION OF THE DRAWINGS

Embodiments of the invention will now be described, by way of example only, with reference to FIGS. 2 to 6 of the accompanying drawings, in which:

FIG. 2 shows a simplified plan view of an aircraft wing having four deployable aero surfaces in their stowed position; and FIG. 3 shows the same simplified plan view of FIG. 2 but during deployment of said aero surfaces from the wing and showing one aero surface in a misaligned state.

DESCRIPTION OF THE PREFERRED EMBODIMENTS

Figure 1:
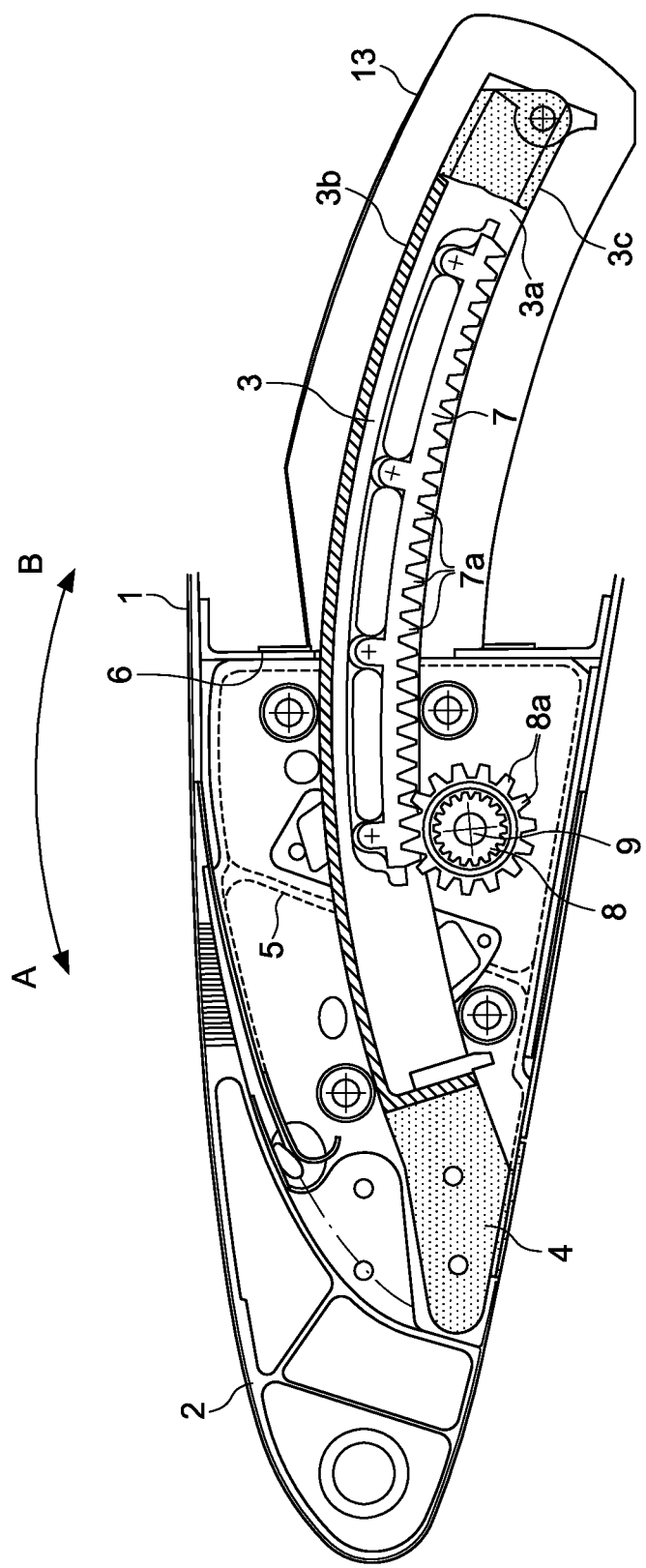
FIG. 1 is a side sectional view showing a known aircraft slat support assembly.

Referring first to FIG. 2, there is shown a simplified plan view of an aircraft wing 10 having a plurality of slats 11a-11d along its leading edge 12.

Each slat has a hole 13 in each of its end walls 14 where it faces end wall 14 of an adjacent slat 11 so that a light beam, such as a laser 15, generated by a laser light generator 16 mounted within the innermost slat 11a closest to the fuselage (not shown) can pass through all of the apertures and reflect back off a reflector 17 mounted within the outermost slat 11d, furthest away from the fuselage. The receptor is integral with the laser light generator 16 to detect the light reflected back through the apertures 13, which has the advantage of being small and light weight and of low power consumption, although it will be appreciated that the receptor may be an entirely separate component.

Although only one laser light generator 16 is shown in the drawings, it will be appreciated that two or more light generators 16 may also be employed and spaced from each other along the wing 10 so that they each detect misalignment of two or more slats 11, as opposed to the single laser arrangement shown in FIGS. 1 and 2 which monitors all four slats 11. By using multiple laser generators 16 at spaced intervals, the accumulative effects of wing bending are reduced.

FIG. 3 shows the same view as FIG. 1 after partial deployment of the slats 11 and also shows that one slat 11b has become misaligned. It can now be seen that the laser 15 cannot reach the reflector 17, as it impinges on the end wall 14 of the misaligned slat 14, rather than passing through the aperture 13, and so will not be reflected back to the receptor. This results in a signal being generated via a controller (not shown) that terminates further deployment of the slats 11.

The hole 13 in the end wall of the slats 11 can have an elongate or slotted shape in the vertical axis, i.e. in an axis that extends out of the plane of the drawings, to accommodate wing bending without triggering a misalignment, i.e. because of the slotted shape, the laser 15 will still reach the reflector 17 and be reflected back to the receptor, despite any wing bending. This ensures that sensitivity in the forward and aft axis is maintained, i.e. in the direction of deployment and retraction of the slats 11.

It will be appreciated that the end walls 11 of the slats are coated or formed with a non-reflective material so that no detectable reflection of the laser 15 occurs when it hits the end wall 11 of a slat in a misaligned condition.

In another embodiment, the laser generator may be used as a measuring device by taking time-of-flight measurements (or pulse measurements) based upon the time of flight of a laser pulse from the laser generator and the time taken for it to reflect back again. The detected time can be compared to a predetermined time to detect whether an aero surface has become misaligned. The predetermined time is preferably the time that a beam would take to reflect back when there is no misalignment. This embodiment can also be used to determine which aero surface has become misaligned. In this instance, the end walls of each of the aero surfaces would be reflective so that the laser is reflected back to the receptor off said surface when a misalignment occurs, rather than pass through the hole in the end wall. Misalignment detection would then be solely based upon a comparison of actual time taken relative to pre-pre-programmed individual times each of which relate to the time taken for a beam to reflect back of a specific misaligned aero surface. By comparing the actual time with each of the individual times, an indication of which aero surface has become misaligned can be made.

The sensitivity of the system can be tuned by optimising the size of holes in the end members of the surface bodies i.e. larger holes allow more misalignment before detection. The size of holes must also be considered so that local distortion of the aero body does not cause an unintended beam interruption.

It will be appreciated that the foregoing description is given by way of example only and that modifications may be made to the slat support assembly of the present invention without departing from the scope of the appended claims.

The invention claimed is:

1. A system for detecting misalignment of an aero surface of a wing relative to other aero surfaces during simultaneous deployment of said aero surfaces during flight, comprising multiple generators spaced from each other along the wing, wherein each generator is configured to shine a beam of light through aligned apertures in a series of aero surfaces towards a respective reflector during deployment of said aero surfaces, multiple receptors, wherein each receptor to detect reflection of said beam of light from each reflector back through said apertures towards the respective generator and, a controller operable to terminate further deployment of said aero surfaces in the event that no reflection is detected by at least one receptor or, if an actual time taken for the reflected beam of light to be detected by at least one receptor differs from a predetermined time, and wherein the wing has leading and trailing edges lying in a first plane and, an axis that extends in substantially at right angles to said first plane, the apertures having an elongate shape extending in the direction of said axis.

2. A system according to claim 1, wherein the apertures are shaped so that the laser will shine through said apertures and reflect back off the respective reflector to the respective receptor throughout the whole range of deployment of the aero surfaces and in the absence of any misalignment of one or more aero surfaces.

3. A system according to claim 1, wherein the receptors and the generators are integrally formed.

4. A system according to claim 1, wherein each generator is mounted to the respective aero surface for movement together with said surface.

5. A system according to claim 1, wherein each reflector is mounted to the respective aero surface for movement together with said surface.

6. A system according to claim 1, wherein the predetermined time is the time taken for a beam of light to pass through all the aero surfaces being monitored and to reflect back to the respective receptor, the controller being configured to measure the actual time and compare it with the predetermined time and to terminate further deployment of the aero surfaces if the actual time differs from the predetermined time at all, or differs from the predetermined time by more than a predetermined amount.

7. A system for detecting misalignment of a slat relative to other slats during simultaneous deployment of said slats from the leading edge of an aircraft wing during flight, comprising multiple generators spaced from each other along the wing, wherein each generator is configured to shine a laser through aligned apertures in a series of slats towards a respective reflector during deployment of said slats, multiple receptors, wherein each receptor to detect reflection of said laser from each reflector back through said apertures to the respective generator and, a controller operable to terminate further deployment of said slats from the leading edge of said aircraft wing in the event that no reflection is detected by at least one receptor or if an actual time taken for the reflected beam of light to be detected by at least one receptor differs from a predetermined time, and wherein the wing has leading and trailing edges lying in a first plane and, an axis that extends in substantially at right angles to said first plane, the apertures having an elongate shape extending in the direction of said axis.

8. A method of detecting misalignment of an aero surface of a wing relative to other aero surfaces during simultaneous deployment of said aero surfaces during flight using multiple generators spaced from each other along the wing, and multiple receptors, comprising the steps of shining a laser through aligned apertures in a series of aero surfaces towards a reflector during deployment of said aero surfaces, detecting reflection of said laser by a respective receptor and terminating further deployment of said aero surfaces in the event that no reflection is detected by at least one receptor, or determining if an actual time taken for the reflected beam of light to be detected by the receptor differs from a predetermined time, and wherein the wing has leading and trailing edges lying in a first plane and, an axis that extends in substantially at right angles to said first plane, the aligned apertures having an elongate shape extending in the direction of said axis.

9. A method according to claim 8, wherein the predetermined time is the time taken for a beam of light to pass through all the aero surfaces and reflect back to the respective receptor, the method including the step of measuring the actual time and comparing it with the predetermined time and terminating further deployment of the aero surfaces if the actual time differs from the predetermined time by more than a predetermined amount.

10. A method according to claim 9, wherein the controller is pre-programmed with an individual time associated with each aero surface, each individual time relating to the time taken for a beam of light to reflect back off a misaligned aero surface, the method including the step of comparing the actual time with each individual time to provide an indication as to which aero surface is in a misaligned condition.

* * * * *